United States Patent
Lee et al.

(10) Patent No.: US 10,020,939 B2
(45) Date of Patent: Jul. 10, 2018

(54) DEVICE, SERVER AND METHOD FOR PROVIDING SECRET KEY ENCRYPTION AND RESTORATION

(71) Applicant: KOREA UNIVERSITY RESEARCH AND BUSINESS FOUNDATION, Seoul (KR)

(72) Inventors: Heejo Lee, Seoul (KR); Hyundo Park, Seoul (KR)

(73) Assignee: KOREA UNIVERSITY RESEARCH AND BUSINESS FOUNDATION, Seoul (KR)

(*) Notice: Subject to any disclaimer, the term of this patent is extended or adjusted under 35 U.S.C. 154(b) by 173 days.

(21) Appl. No.: 15/140,742

(22) Filed: Apr. 28, 2016

(65) Prior Publication Data

US 2016/0323105 A1    Nov. 3, 2016

(30) Foreign Application Priority Data

Apr. 28, 2015  (KR) .................. 10-2015-0059763
Jun. 19, 2015  (KR) .................. 10-2015-0087580

(51) Int. Cl.
    *H04L 9/08*    (2006.01)
(52) U.S. Cl.
    CPC ............ *H04L 9/0897* (2013.01); *H04L 9/083* (2013.01); *H04L 9/0863* (2013.01); *H04L 9/0894* (2013.01)
(58) Field of Classification Search
    CPC ... H04L 9/0897; H04L 9/0894; H04L 9/0863; H04L 9/083
    See application file for complete search history.

(56) References Cited

U.S. PATENT DOCUMENTS 8,995,660 B2    3/2015   Kobayashi et al.
2003/0204732 A1*  10/2003  Audebert ............ H04L 63/0846
                                                   713/182
(Continued)

FOREIGN PATENT DOCUMENTS

KR    10-2001-0045157 A    6/2001
KR    10-2013-0096575 A    8/2013
KR    10-2013-0113909 A   10/2013

OTHER PUBLICATIONS

Oh, et al., "Key Management and Recovery Scheme over SCADA System Using ID-based Cryptosystem", Journal of the Korea Institute of Information Security and Cryptology, vol. 22, No. 3, Jun. 2012, pp. 427-438.

*Primary Examiner* — Meng Li
(74) *Attorney, Agent, or Firm* — Pearne & Gordon LLP

(57) ABSTRACT

The present disclosure includes: a communication module; a memory that stores a secret key encryption and restoration program; and a processor that executes the program, wherein when a request for restoration of a secret key is received from a user, the processor restores the secret key of which restoration is requested on the basis of restoration information received from each of a key management server and one or more trusted devices according to execution of the program, the secret key of the user is generated and encrypted by the processor in response to the request from the user, and the restoration information is generated corresponding to the secret key and then transmitted to each of the key management server and the one or more trusted devices through the communication module.

12 Claims, 10 Drawing Sheets

(56) References Cited

U.S. PATENT DOCUMENTS

| | | | |
|---|---|---|---|
| 2007/0160197 A1* | 7/2007 | Kagaya | G06Q 20/382 380/28 |
| 2007/0204170 A1* | 8/2007 | Oren | G06F 21/72 713/189 |
| 2012/0036370 A1* | 2/2012 | Lim | H04L 9/0822 713/189 |
| 2013/0159699 A1* | 6/2013 | Torkkel | G06F 21/6245 713/155 |

* cited by examiner

DEVICE, SERVER AND METHOD FOR PROVIDING SECRET KEY ENCRYPTION AND RESTORATION

CROSS-REFERENCE TO RELATED APPLICATION

This application claims the benefit under 35 USC 119(a) of Korean Patent Application No. 10-2015-0059763 filed on Apr. 28, 2015 and No. 10-2015-0087580 filed on Jun. 19, 2015, in the Korean Intellectual Property Office, the entire disclosures of which are incorporated herein by reference for all purposes.

TECHNICAL FIELD

The present disclosure relates to a device, a server, and a method for providing secret key encryption and restoration.

BACKGROUND

A general public key cryptosystem uses an encryption protocol using a pair of a public key and a secret key of a user. Herein, the public key is public, but the secret key corresponding to the public key is not shared with anyone but the user. In the public key cryptosystem, the secret key generated by the user is encrypted using a password of the user and then safely stored in a user device. Further, when the user uses the public key encryption protocol, the encrypted secret key is decrypted using the password of the user. After use, the secrete key is encrypted again using the password and stored.

The general public key cryptosystem is configured to store a copy of the user's secret key in a key management server in case the secret key is corrupted or lost. For example, when the user generates a secret key, the user may access the key management server through the user device and register the secret key or encrypted secret key. Further, when the secret key is corrupted or lost, the user may access the key management server through the user device and receive and restore the registered secret key or encrypted secret key.

In the general public key cryptosystem, if the key management server keeps a secret key of the user, there is a high possibility that mass leak of multiple user secret keys managed in the key management server may occur due to an external attack such as hacking. If the user's secret key in the key management server is leaked in a payment service and a financial service, payment information, financial information, and personal information of the use may be further leaked.

Further, if the user encrypts the secret key with the user's password and stores the encrypted secret key in the key management server, when the user forgets the password, the user needs to reset a new password.

The user's secret key is stored in the key management server as being encrypted with the user's existing password. Therefore, if the user resets a password, the user needs to use the reset password. Thus, the user cannot decrypt the encrypted secret key stored in the key management server. Accordingly, in the general public key cryptosystem, if the user forgets the password, the user needs to discard the encrypted secret key stored in the key management server and encrypt a secrete key again on the basis of the reset password.

As a conventional technology relating to a public key cryptosystem, U.S. Pat. No. 8,995,660 (entitled "Cryptographic system, cryptographic communication method, encryption apparatus, key generation apparatus, decryption apparatus, content server, program, and storage medium") provides a cryptographic communication technology that is based on functional encryption and that can operate flexibly. To be specific, this technology extracts attribute information and logic information from user's input information on the basis of a pair of attribute conversion rule information and logical expression conversion rule information and uses the extracted information for encryption.

Further, Korean Patent Laid-open Publication No. 10-2013-0096575 (entitled "Apparatus and method for distributing group key based on public key") discloses a method for distributing a group key in a group key management server in response to a request from a new user to join a group. To be specific, this method includes: receiving a message, which is encrypted with a user public key and a user secret key and requests joining a specific group, from a new user device; authenticating the new user device by decrypting the message; and transmitting a group key being used in the group to the new user device.

SUMMARY

The present exemplary embodiment of the present disclosure provides a device, a server, and a method for encryption of a secret key of a user and restoration of the secret key and a password of the user.

However, problems to be solved by the present disclosure are not limited to the above-described problems. There may be other problems to be solved by the present disclosure.

As a technical means for solving the above-described problem, in accordance with a first exemplary embodiment, there is provided a secret key encryption and restoration device. The secret key encryption and restoration device includes a communication module; a memory that stores a secret key encryption and restoration program; and a processor that executes the program. Wherein when a request for restoration of a secret key is received from a user, the processor restores the secret key of which restoration is requested on the basis of restoration information received from each of a key management server and one or more trusted devices according to execution of the program, the secret key of the user is generated and encrypted by the processor in response to the request from the user, and the restoration information is generated corresponding to the secret key and then transmitted to each of the key management server and the one or more trusted devices through the communication module.

Further, in accordance with a second exemplary embodiment, there is provided a secret key encryption and restoration method in a device. The method includes receiving, by the device, each restoration information from a key management server and one or more trusted devices in response to a request for restoration of a secret key of a user; and performing, by the device, restoration of the secret key of which restoration is requested on the basis of the received restoration information. Wherein the secret key is generated by the device and then encrypted, and the restoration information is generated corresponding to the secret key and then transmitted to the key management server and the one or more trusted devices.

Further, in accordance with a third exemplary embodiment, there is provided a key management server that provides secret key encryption and restoration. The key management server includes a communication module; a storage module; a memory that stores a secret key encryption and restoration program; and a processor that executes the program. Wherein the processor receives a local key and restoration information from a device and stores them in the storage module according to execution of the program, and the processor transmits any one or more of the local key and the restoration information stored in the storage module to the device in response to a request from the device.

In accordance with any one of the aspects of the present disclosure, a user's secret key is not stored in a central server such as a key management server. Thus, it is possible to suppress a leakage of the user's secret key caused by an external attack such as hacking. Further, according to the present disclosure, if the user loses the secret key, the secret key can be restored safely on the basis of restoration information distributed and stored in a trusted device.

Further, in accordance with the present disclosure, even if the user forgets a password, the existing secret key can be stored safely. Therefore, the user does not need to be issued a new secret key. Furthermore, according to the present disclosure, when the user forgets the password, the risk of losing the secret key can be reduced. Therefore, according to the present disclosure, it is possible to conveniently reset a password, and even if the user forgets the password, it is possible to protect the user against a leakage of important information such as payment information, financial information, and personal information.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
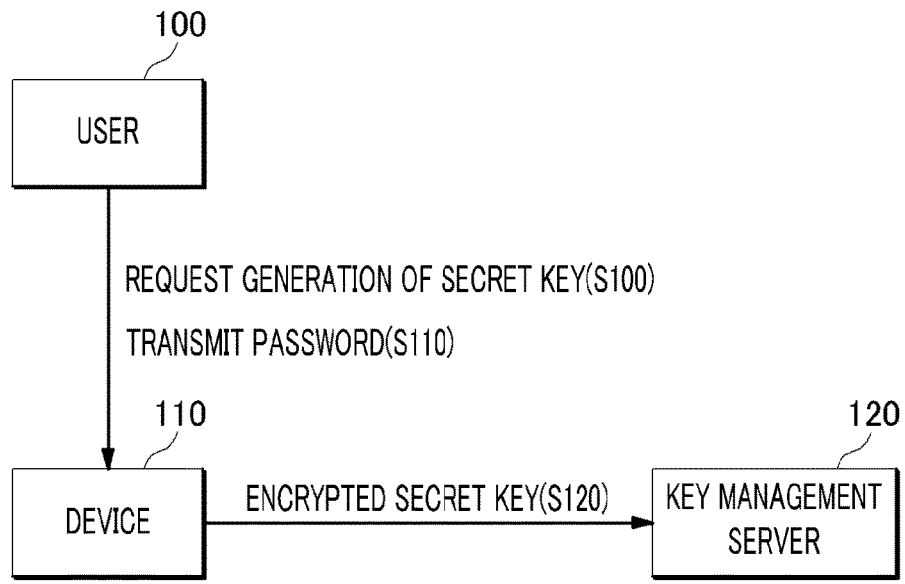
FIG. 1 is a block diagram illustrating secret key encryption of the device depend on a conventional public key encryption protocol.

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, the term "comprises or includes" and/or "comprising or including" used in the document means that one or more other components, steps, operation and/or existence or addition of elements are not excluded in addition to the described components, steps, operation and/or elements unless context dictates otherwise.

Hereinafter, a conventional process for secret key encryption and restoration in a device 110 will be described with reference to FIG. 1 and FIG. 2.

FIG. 1 is a block diagram illustrating secret key encryption of the device 110 depend on a conventional public key encryption protocol.

In order to use a public key encryption protocol in the conventional process for encryption and restoration of a secret key, a user 100 may make a request for generation of a user secret key and a user public key to the device 110 (S100). When the device 110 receives the request for generation of a user secret key and a user public key from the user 100, the device 110 generates the user public key and the user secret key.

Then, the device 110 receives a password from the user 100 for encryption of the user secret key (S110). The device 110 encrypts the user secret key on the basis of the password received from the user 100. Herein, the device 110 may store and keep the encrypted secret key in a storage module. Further, the device 110 copies the encrypted user secret key and transmits the copied user secret key to a key management server 120 to be kept therein for restoration of the user secret key (S120).

If the user 100 makes a request for decryption of the user secret key and transmits the password, the device 110 decrypts the encrypted user secret key stored in the device 110 using the password received from the user 100.

As such, in the conventional public key encryption protocol, the key management server 120 may keep the encrypted user secret key received from the user. Further, if the user 100 corrupts or loses the user secret key, the device 110 receives the encrypted user secret key from the key management server 120 and restores the lost or corrupted user secret key. A restoration process of a user secret key encrypted by conventional secret key encryption will be described with reference to FIG. 2.

Figure 2:
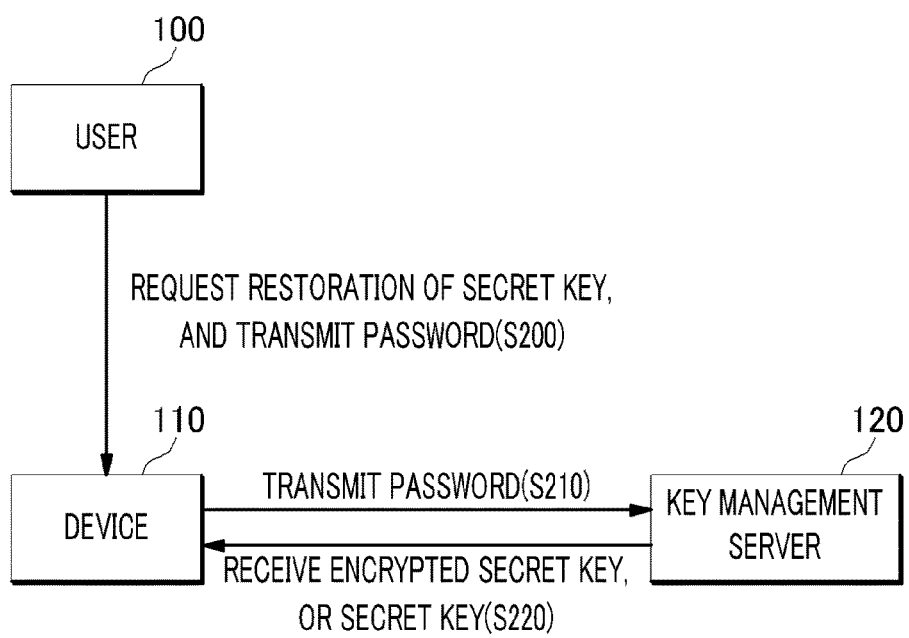
FIG. 2 is a block diagram illustrating a user secret key restoration process of the device depend on the conventional public key encryption protocol.

FIG. 2 is a block diagram illustrating a user secret key restoration process of the device 110 depend on the conventional public key encryption protocol.

If the user secret key is lost or corrupted, the device 110 restores the lost or corrupted user secret key through the key management server 120. To be specific, the device 110 receives the password from the user 100 in response to a request for restoration of the user secret key from the user 100 (S200). Then, the device 110 transmits the password received from the user 100 to the key management server 120 (S210).

The key management server 120 that receives the password may transmit the user secret key corresponding to the password to the device 110 (S220). Herein, the key management server 120 may decrypt the encrypted user secret key and then transmit the decrypted user secret key to the device 110, or may transmit the encrypted user secret key to the device 110. As such, in the conventional public key encryption protocol, the device 110 may store a copy of the generated user secret key in the key management server 120 and use the copy for restoration.

The key management server 120 may encrypt the copy of the user secret key using the password of the user 100 and then store the copy therein in order to suppress a leakage of previously stored copies of user secret keys caused by hacking or the like. Otherwise, the key management server 120 may encrypt multiple user secret keys using one mater key and store the encrypted user secret keys therein. However, if a copy of a user secret key is stored and managed in the key management server 120 as such, there is a high risk of a leakage caused by an external attack such as hacking.

Since the device 110 and the key management server 120 do not store the password, if the user 100 forgets the password, the user 100 cannot restore the forgotten password. Therefore, if the user 100 forgets the password, the device 110 cannot decrypt nor restore the encrypted user secret key. Accordingly, if the user 100 forgets the password, the user 100 needs to generate a new password and a new user secrete key.

Hereinafter, a device 300 configured to provide secret key encryption and restoration in accordance with an exemplary embodiment of the present disclosure will be described with reference to FIG. 3 to FIG. 7.

Figure 3:
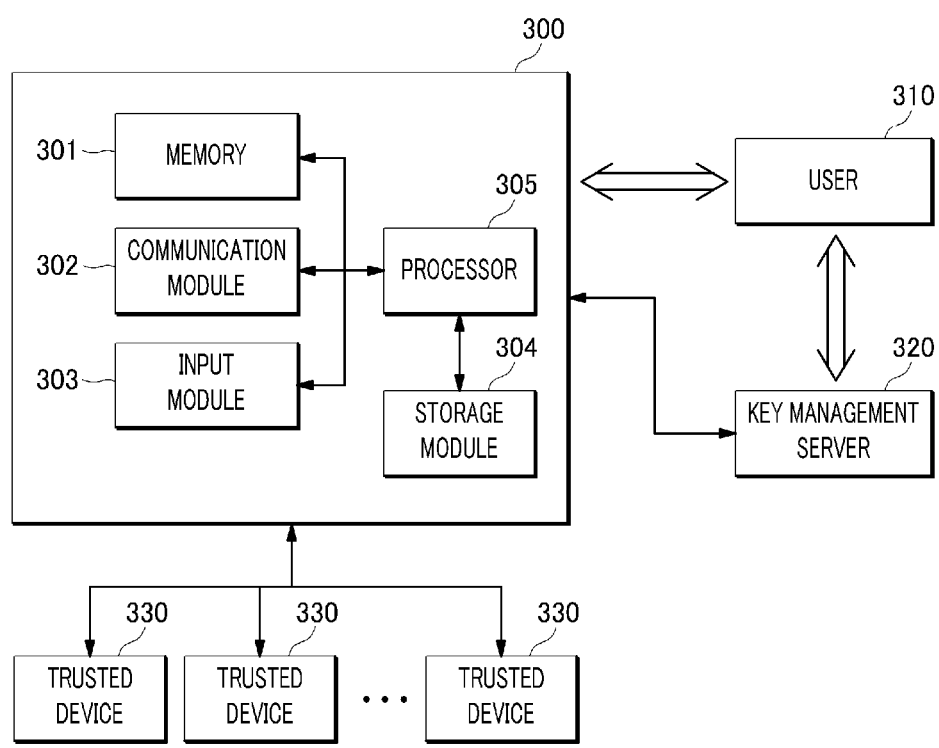
FIG. 3 is a block diagram illustrating the device configured to provide encryption and restoration of secret key in accordance with an exemplary embodiment of the present disclosure.

FIG. 3 is a block diagram illustrating the device 300 configured to provide encryption and restoration of secret key in accordance with an exemplary embodiment of the present disclosure.

The device 300 in accordance with an exemplary embodiment of the present disclosure provides encryption and decryption of a user secret key. Further, the device 300 provides a method for safe restoration when a user secret key and a user password are corrupted or lost. Herein, the device 300 includes a memory 301, a communication module 302, an input module 303, a storage module 304, and a processor 305.

The memory 301 is configured to store a secret key encryption and restoration program. Herein, the memory 301 is the collective name for non-volatile storage devices that can keep information stored therein even when power is not supplied.

The communication module 302 performs communication with a key management server 320 and one or more trusted devices 330. Herein, the communication module 302 may be a network module that provides wired or wireless network communication and a computing bus module such as IDE (integrated drive electronics), PCI (peripheral component interconnect) BUS, PATA (parallel ATA), SATA (serial ATA), and USB (universal serial bus).

The input module 303 is configured to receive a user password or the like from a user 310. Herein, the input module 303 may be an input device such as a keyboard, a mouse, a joystick, and a touch pad. Further, the input module 303 may be a resistive or capacitive touch screen panel, and may be implemented as being integrated with a display module (not illustrated) included in the device 300.

The storage module 304 is configured to store an encrypted user secret key and an encrypted user local key. Herein, the storage module 304 may be provided as a storage device, such as a solid state driver and a hard disk driver, within the device 300. Otherwise, the storage module 304 may be a storage device or storage module server connected through the communication module 302.

The processor 305 is configured to generate a user secret key depend on execution of a program stored in the storage module 304. Further, the processor 305 may generate a user public key corresponding to the user secret key and a user local key for encryption of the user secret key. The processor 305 may manage the generated user secret key and the generated user public key in pairs, and disclose the generated user public key. Further, the processor 305 may encrypt the generated user secret key.

The user secret key encryption process will be described in detail with reference to FIG. 4.

Figure 4:
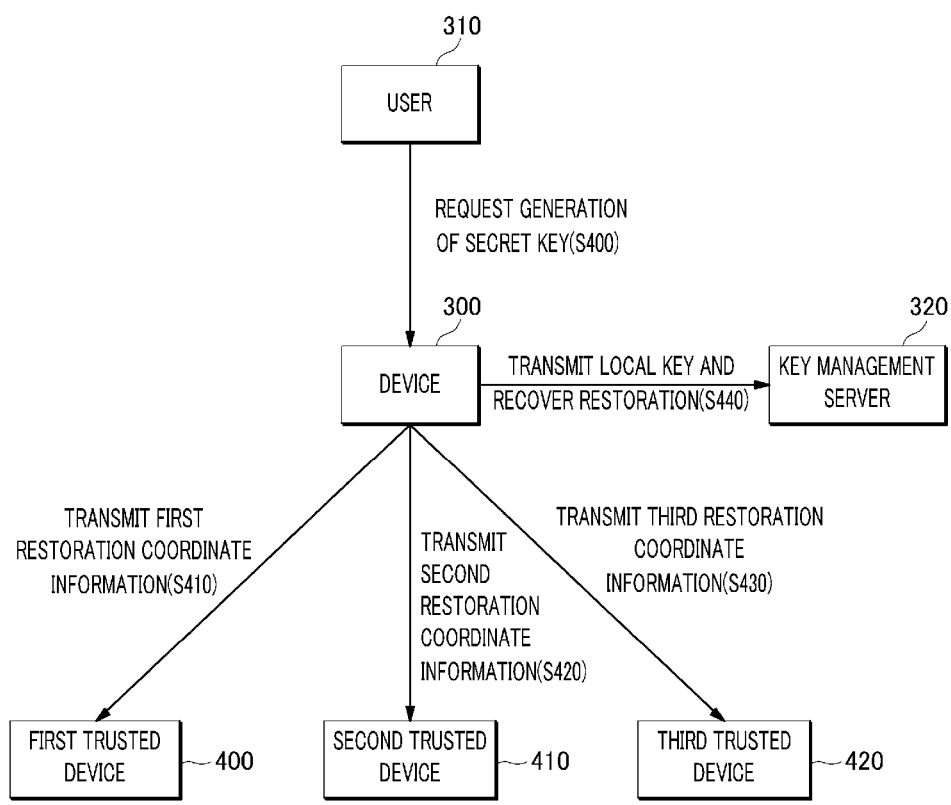
FIG. 4 is a block diagram illustrating a secret key encryption process of the device in accordance with an exemplary embodiment of the present disclosure.

FIG. 4 is a block diagram illustrating a secret key encryption process of the device 300 in accordance with an exemplary embodiment of the present disclosure.

If a user secret key generation request (S400) is received from the user 310, the processor 305 may generate a user secret key, a user public key corresponding to the user secret key, and a user local key.

The processor 305 may generate a password and share the password with the user 310. In this case, the password may be input by the user 310 through the input module 303. Otherwise, the password may be generated by the processor 305 and then transmitted to the user 310. Herein, the processor 305 does not store the password shared with the user 310 in the storage module 304.

The processor 305 may encrypt the generated user secret key. Herein, the processor 305 may perform a two-step encryption process to the user secret key on the basis of the user local key and the password. For example, the processor 305 may primarily encrypt the user secret key on the basis of the user local key. Then, the processor 305 may secondarily encrypt the primarily encrypted user secret key using the password. If the user secret key is encrypted, the processor 305 may store the encrypted user secrete key in the storage module 304.

Further, the processor 305 may encrypt the generated local key using a key management server public key disclosed by the key management server 320 and generate a public key encryption local key. Herein, the public key encryption local key may be used for restoration of the password when the user 310 forgets the password. Therefore, the processor 305 may transmit the public key encryption local key to the key management server 320 for restoration of the password (S410). Then, the key management server 320 may store the received public key encryption local key for restoration of the password in a storage module of the key management server 320.

The processor 305 may encrypt the user local key again using the password and generate a password encryption local key. Herein, the password encryption local key may be used for decryption of the encrypted user secret key. After generating the password encryption local key, the processor 305 may store the generated password encryption local key in the storage module 304.

The processor 305 generates restoration information corresponding to the encrypted user secret key for restoration of the user secret key. Herein, the restoration information may include one or more restoration coordinate information and one or more parameters generated on the basis of the encrypted user secret key.

For example, the restoration information may be generated on the basis of a Shamir secret sharing scheme. The processor 305 may generate one or more restoration coordinate information including information about the encrypted user secret key depend on the Shamir secret sharing scheme. Further, the processor 305 may distribute and store the generated one or more restoration coordinate information in the one or more trusted devices 330 through the communication module 302. The processor 305 may restore the user secret key on the basis of the restoration coordinate information stored in the trusted devices 330 when the user 310 loses the user secret key or when the user secret key is corrupted.

Herein, the trusted devices 330 may include any one or more of user devices trusted and previously selected by the user 310 and trusted devices 330 included in a trusted device group selected by the key management server 320 and transmitted to the processor 305 through the communication module 302. Herein, the trusted device group may include one or more trusted devices 330 previously selected by the user 310 offline or online. Further, the trusted device group may include trusted devices 330 selected by the key management server 320 or devices selected as trusted devices 330 by multiple users.

The trusted device group may include the key management server 320. That is, the processor 305 may select the key management server 320 as the trusted device 330 and transmit the restoration coordinate information to the key management server 320. Further, the trusted device group 300 may include another device being used by the user 310.

A restoration information generation process will be described in detail. Firstly, the processor 305 may select restoration parameters p, n, and k for a user secret key $K_{S_1}$. Herein, p is a prime number used in a restoration coordinate generation process, and may be higher than the number of user secret keys and the number of the trusted devices 330. Further, n is the number of coordinates for restoration, and k is the number of the trusted devices 330. Herein, k may be equal to lower than n.

The processor 305 may select the restoration parameters and generate a secret key restoration polynomial as expressed by Equation 1. Then, the processor 305 may select $a_i$ having the same value as the user secret key $K_{S_1}$ and supplement i to the restoration parameters.

$$f(x)=a_0+a_1x+ \ldots +a_{k-1}x^{k-1} \quad \text{[Equation 1]}$$

where $K_{S_1} \in \{a_0, a^1, \ldots, a_{k-1}\}$

The processor 305 may select coordinates (x, f(x)) for n number of times of restoration on the basis of Equation 1. Then, the processor 305 may select k number of restoration coordinate information among n number of coordinates. Then, the processor 305 may substitute f(x) with f'(x). Herein, f'(x) can be derived as shown in Equation 2.

$$f'(x)=f(x)(\mathrm{mod}\ p) \quad \text{[Equation 2]}$$

The processor 305 may add m as the quotient in the remaining operation of Equation 2 to each of coordinates and generate k number of restoration coordinate information as shown in Equation 3. That is, the restoration information may include the k number of restoration coordinate information as shown in Equation 3 and the restoration parameters p, n, k, and i.

$$(x_0,f'(x_0),m_0),(x_1,f'(x_1),m_1, \ldots ,(x_{k-1},f'(x_{k-1}),m_{k-1}) \quad \text{[Equation 3]}$$

The processor 305 may distribute and transmit the restoration coordinate information included in the generated restoration information to the one or more trusted devices 330 through the communication module 302. Herein, the number of the trusted devices 330 to which the restoration coordinate information is transmitted may be higher than the minimum number of restoration coordinate information required for restoration. Further, if necessary, the processor 305 may transmit the same coordinate information to the one or more trusted devices 330.

Referring to FIG. 4, if the minimum number of restoration coordinate information required for restoration is 2 (two), the processor 305 may transmit the restoration coordinate information to each of two trusted devices, i.e., a second trusted device 410 and a third trusted device 420, in the trusted device group 400 to 420 (S420 and S430).

If the second trusted device 410 of the two trusted devices 410 and 420 which receive the two restoration coordinate information has a problem and cannot perform communication, or if the restoration coordinate information stored in the second trusted device 410 is lost, the processor 305 may store the restoration coordinate information stored in the second trusted device 410 in another trusted device. Firstly, the processor 305 may select a first trusted device 400 among other trusted devices which are included in the trusted device group 400 to 420 and do not receive the restoration coordinate information. Then, the processor 305 may transmit first restoration coordinate information stored in the second trusted device 410 to the selected first trusted device 400 (S440). Therefore, the processor 305 can maintain trusted devices in the number required for restoration of a user secret key to keep restoration coordinate information.

Further, the processor 305 may transmit the restoration parameters to the key management server 320 through the communication module 302 (S450). The processor 305 may transmit the restoration parameters and then erase unencrypted user secret key and user local key.

As such, the processor 305 may store the encrypted user secret key and the password encryption local key in the storage module 304 and disclose the generated user public key through the secret key encryption process. Further, the key management server 320 may store the public key encryption local key corresponding to the user 310 and the restoration parameters in the storage module of the key management server 310. The trusted devices 330 may store the restoration coordinate information received from the device 300.

If the user 310 makes a request for decryption of the encrypted user secret key in order to use a public key encryption protocol, the processor 305 may decrypt the encrypted user secret key on the basis of the password.

To be specific, the processor 305 may decrypt the encrypted user local key being stored in the storage module 304 using the password input by the user through the input module 303 after making the request for decryption of the user secret key. Then, the processor 305 may decrypt the encrypted user secret key being stored in the storage module 304 on the basis of the decrypted user local key.

Meanwhile, if the user makes a request for restoration of the user secret key when the secret key is corrupted or lost, the processor 305 restores the user secret key on the basis of the restoration information transmitted to the key management server 320 and the trusted devices 330. A secret key restoration process will be described in detail with reference to FIG. 5.

Figure 5:
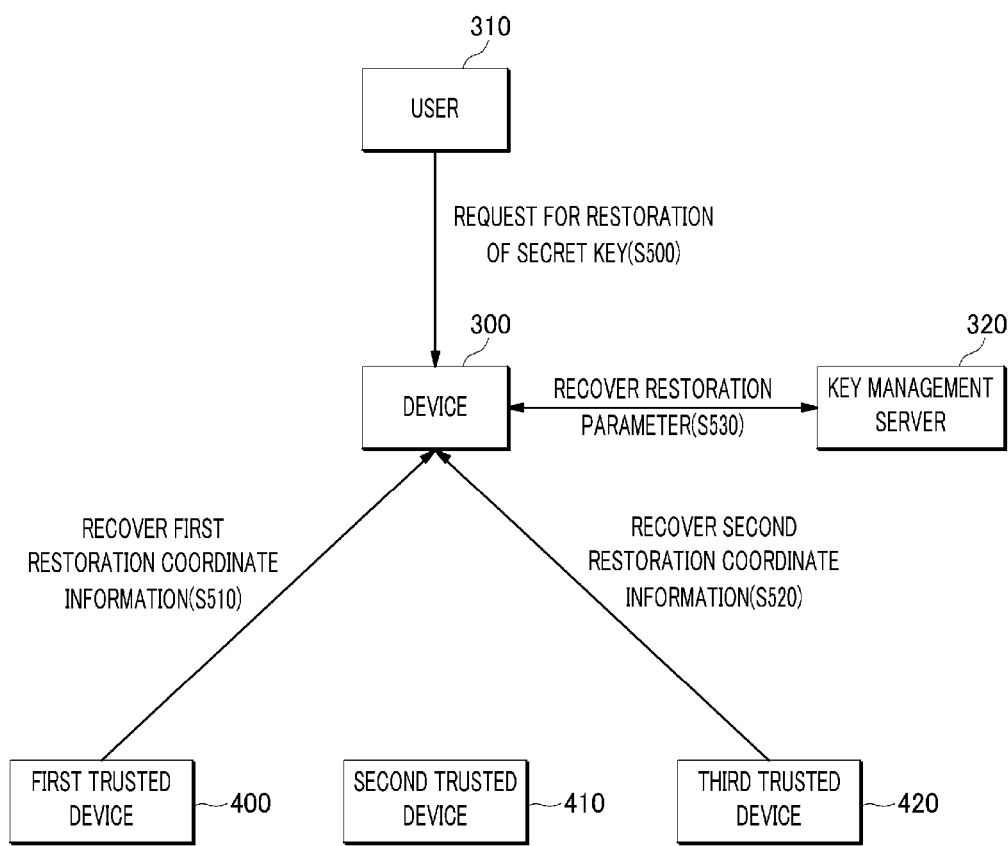
FIG. 5 is a block diagram illustrating a secret key restoration process of the device in accordance with an exemplary embodiment of the present disclosure.

FIG. 5 is a block diagram illustrating a secret key restoration process of the device 300 in accordance with an exemplary embodiment of the present disclosure.

If the user 310 makes a request for restoration of the user secret key (S500), the processor 305 may recover the restoration parameters and the public key encryption local key corresponding to the user 310 from the key management server 320 (S530). Then, the processor 305 may recover the first restoration coordinate information and second restoration coordinate information transmitted to each of the first trusted device 400 and the third trusted device 420 (S510 and S520).

The processor 305 restores the user secret key on the basis of the recovered restoration coordinate information and restoration parameters. Firstly, the processor 305 may substitute the restoration coordinate information with coordinates prior to performing the remaining operation, and restore the secret key restoration polynomial as expressed by Equation 1. For example, the processor 305 may restore the secret key restoration polynomial using Lagrange basis polynomial and Lagrange interpolation polynomial. Further, the processor 305 may restore the user secret key on the basis of the restoration parameters and the restored secret key restoration polynomial. After restoring the user secret key, the processor 305 may decrypt the encrypted user local key using the password and generate an encrypted user secret key again on the basis of the decrypted user local key.

Herein, if the user secret key and the user local key are corrupted or lost, the processor 305 may generate a new user local key and encrypt the new user local key using the key management server public key. The processor 305 may transmit the new user local key encrypted on the basis of the key management server public key to the key management server 320 and substitute the previously stored public key encryption local key corresponding to the user with the new user local key. Then, the processor 305 may encrypt the new user local key using the password and store the new user local key in the storage module 304. Further, the processor 305 may encrypt the restored user secret key again on the basis of the new user local key and generate an encrypted user secret key.

If the user corrupts or loses only the user local key, the processor 305 may store the user local key in the same manner as the case where the user secret key and the user local key are corrupted or lost.

If the user 310 makes a request for resetting of a password, the processor 305 may regenerate the password on the basis of the public key encryption local key previously stored in the key management server 320. A password regeneration process will be described in detail with reference to FIG. 6.

Figure 6:
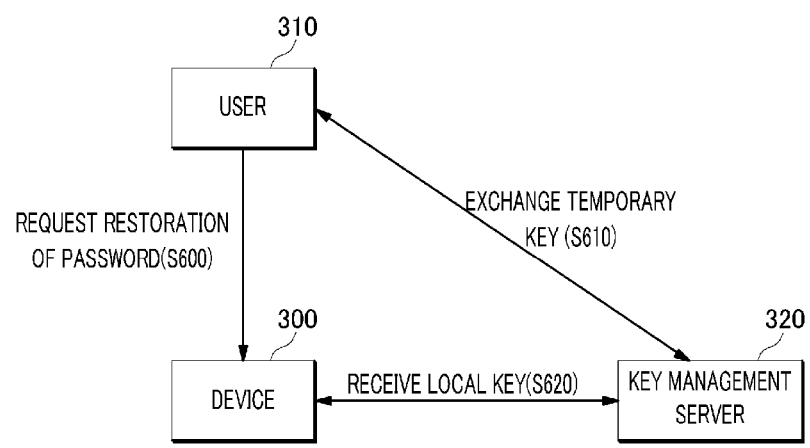
FIG. 6 is a block diagram provided to explain a password regeneration process of the device 300 in accordance with an exemplary embodiment of the present disclosure.

FIG. 6 is a block diagram provided to explain a password regeneration process of the device 300 in accordance with an exemplary embodiment of the present disclosure.

If a request for restoration of the password is received from the user 310 (S600), the processor 305 may make a request for authentication of the user 310 to the key management server 320. Herein, the authentication of the user 310 may include authentication using SMS, e-mail, and ARS previously set in the key management server 320 by the user 310, authentication using an OTP (one time password) token, and authentication through a certified authentication center.

The key management server 320 in accordance with an exemplary embodiment of the present disclosure may perform authentication of the user 310 by multiple methods of the above-described authentication methods.

If the user 310 is authenticated, the key management server 320 may decrypt the public key encryption local key corresponding to the user 310 on the basis of the key management server public key. The key management server 320 may generate a temporary key for single use and transmit the generated temporary key to the user 310 (S610). Herein, the key management server 320 may transmit the temporary key to the user 310 using SMS and e-mail previously set by the user 310.

Further, the key management server 320 may encrypt the decrypted user local key on the basis of the temporary key and generate a temporary key encryption local key. The key management server 320 may transmit the generated temporary key encryption local key to the processor 305 (S620).

The processor 305 may receive the temporary key encryption local key transmitted from the key management server 320 through the communication module 302. Further, if the user 310 inputs the temporary key through the input module 303, the processor 305 may decrypt the temporary key encryption local key transmitted from the key management server 320 on the basis of the input temporary key and generate a user local key. Then, the processor 305 may decrypt the encrypted user secret key on the basis of the user local key.

After decrypting the encrypted user secret key, the processor 305 may generate a new user local key. Further, the processor 305 may generate a new password. Furthermore, the processor 305 may generate a new user local key using the new password and then store the new user local key in the storage module 304.

Further, the processor 305 may encrypt the decrypted user secret key again using the new user local key. The processor 305 may encrypt the new user local key using the key management server public key and generate a new public key encryption local key and then transmit the new public key encryption local key to the key management server 320. The key management server 320 may substitute the previously stored public key encryption local key corresponding to the user 310 with the new public key encryption local key and then store the new public key encryption local key in the storage module.

Hereinafter, a secret key encryption and restoration method in the device 300 in accordance with an exemplary embodiment of the present disclosure will be described with reference to FIG. 7 to FIG. 10.

Figure 7:
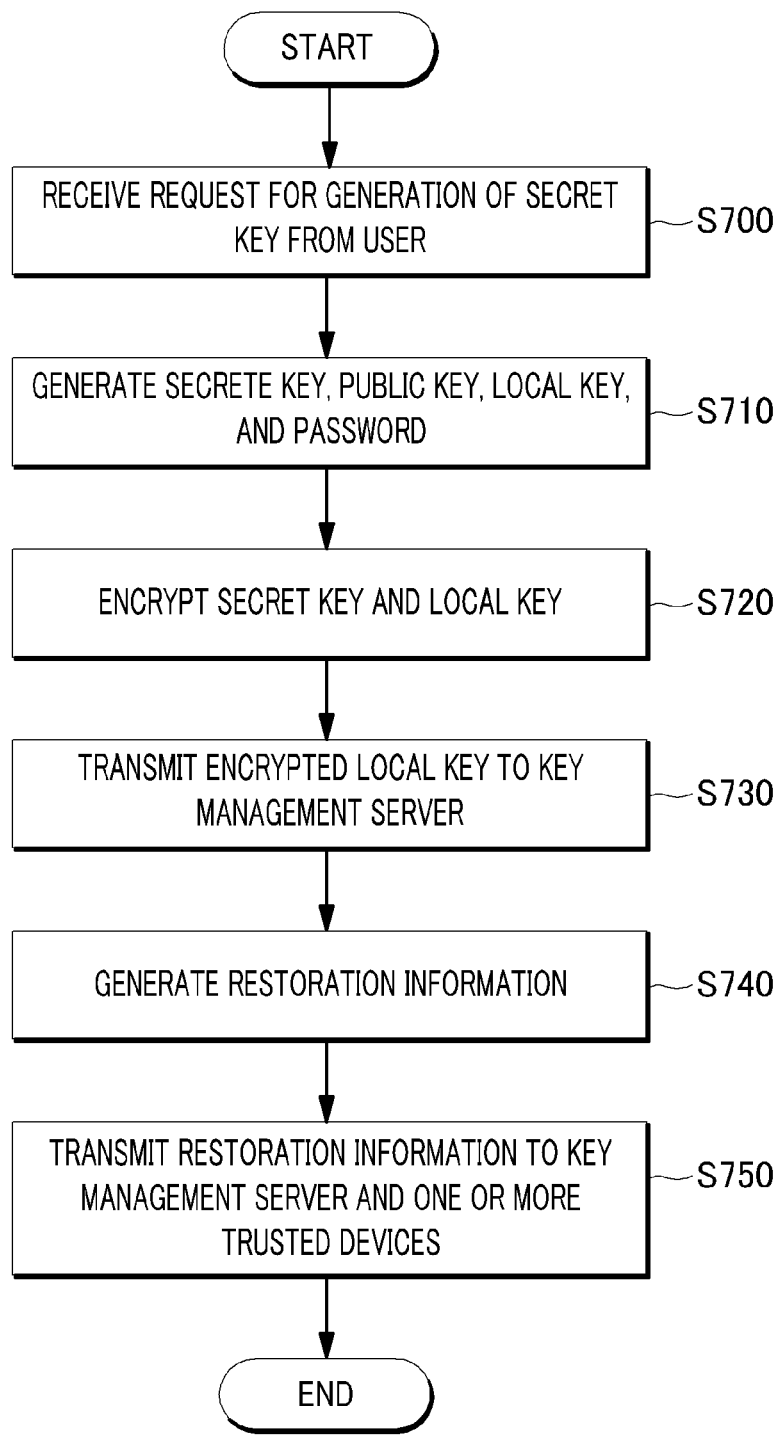
FIG. 7 is a flowchart of a secret key generation method in the device 300 in accordance with an exemplary embodiment of the present disclosure.

FIG. 7 is a flowchart of a secret key generation method in the device 300 in accordance with an exemplary embodiment of the present disclosure.

If a request for generation of a secret key is received from the user 310 (S700), the device 300 generates a user secret key, a user local key, and a password (S710). Then, the device 300 may generate and disclose a user public key corresponding to the user secret key and. Herein, the password may be input by the user 310, or may be generated in the device 300 and then transmitted to the user 310.

The device 300 may encrypt the user secret key and the user local key (S720). To be specific, the device 300 may encrypt the user local key on the basis of a key management server public key disclosed by the key management server 320 and generate a public key encryption local key. Then, the device 300 may transmit the generated public key encryption local key to the key management server 320 (S730). Further, the device 300 may encrypt the user secret key on the basis of the user local key and the password and then store the encrypted user secret key.

After encrypting the user secret key, the device 300 may generate restoration information for restoration of the user secret key (S740). Herein, the restoration information may include the restoration coordinate information and restoration parameters described above with reference to FIG. 4.

After generating the restoration information, the device 300 may transmit the restoration information to the key management server 320 and the one or more trusted devices 330 (S750). Herein, the device 300 may transmit the restoration parameters to the key management server 320 and transmit the restoration coordinate information to each of the one or more trusted devices 330.

Figure 8:
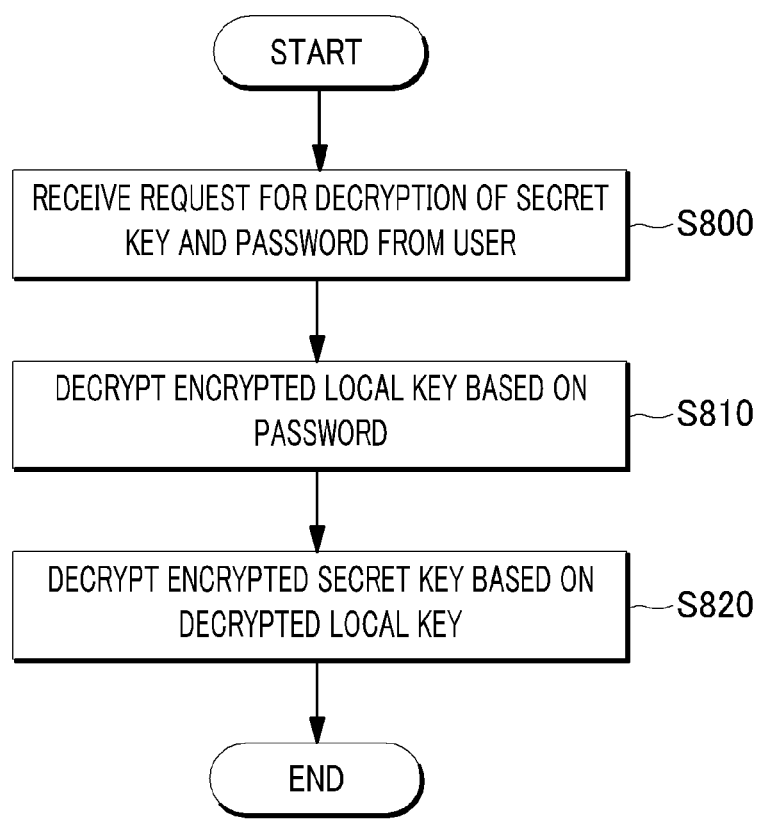
FIG. 8 is a flowchart of a secret key decryption method in the device 300 in accordance with an exemplary embodiment of the present disclosure.

FIG. 8 is a flowchart of a secret key decryption method in the device 300 in accordance with an exemplary embodiment of the present disclosure.

After the user secret key is encrypted, if a request for decryption of the secret key of the user 310 and the password re received (S800), the device 300 may decrypt the encrypted user local key on the basis of the password (S810). Then, the device 300 may decrypt the encrypted user secret key using the decrypted user local key (S820)

Figure 9:
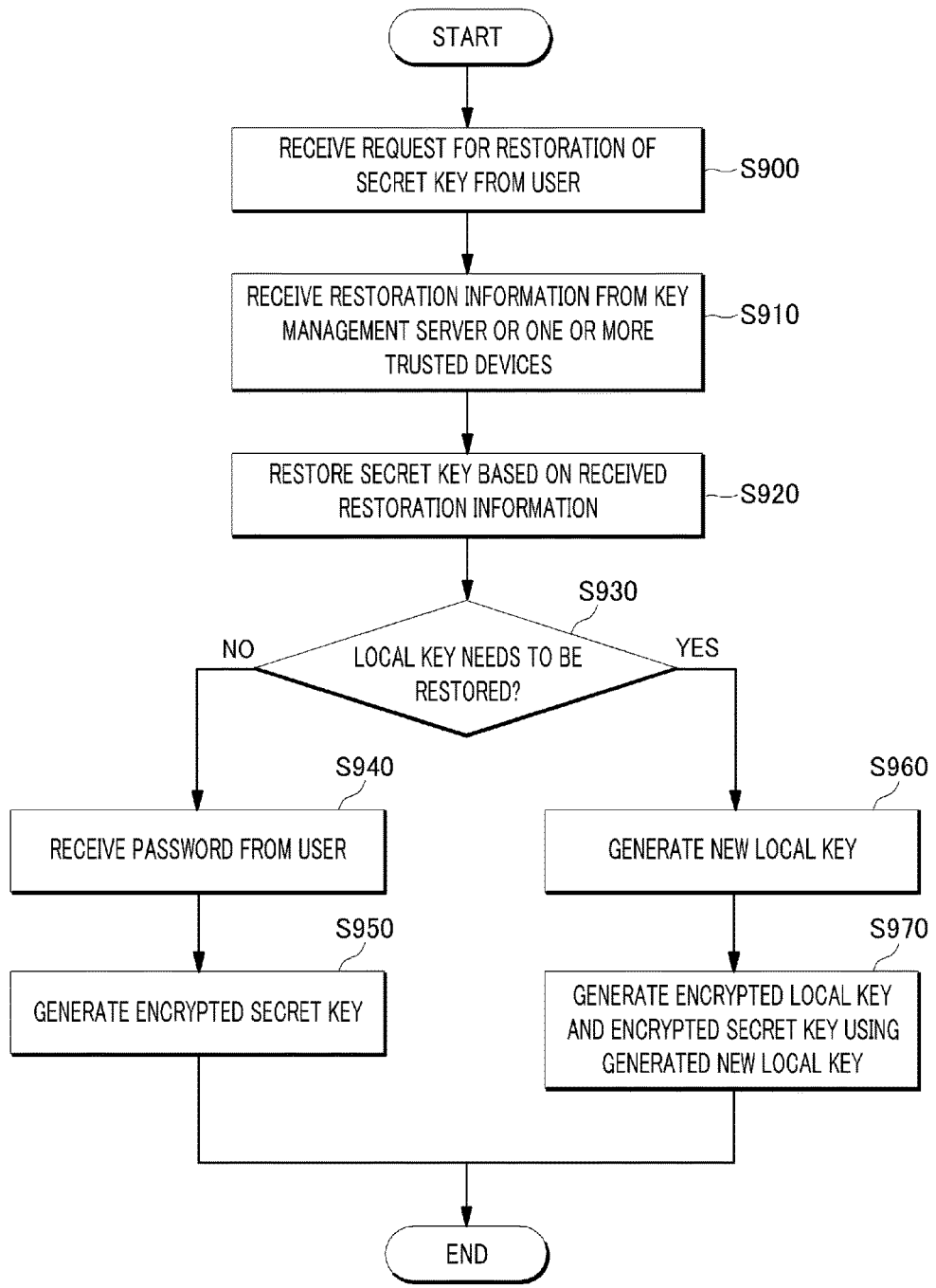
FIG. 9 is a flowchart of a secret key restoration method in the device 300 in accordance with an exemplary embodiment of the present disclosure.

FIG. 9 is a flowchart of a secret key restoration method in the device 300 in accordance with an exemplary embodiment of the present disclosure.

If a request for restoration of the secret key is received from the user 310, the device 300 may receive the restoration information from the key management server 320 and one or more trusted devices 330 (S910). Herein, the device 300 may receive the restoration parameters from the key management server 320 and receive the restoration coordinate information from the one or more trusted devices 330.

Then, the device 300 may restore the user secret key on the basis of the restoration parameters received from the key management server 320 and the restoration coordinate information received from the one or more trusted devices 330 (S920). Herein, if only the user secret key is corrupted or lost, the device 300 may receive the password from the user 310 (S940), and generate an encrypted user secret key on the basis of the received password and the previously stored user local key (S950).

If the user secret key and the user local key are corrupted or lost and need to be restored (S930), the device 300 may generate a new user local key (S960) and encrypt the new user local key and user secret key. Herein, the device 300 may encrypt the new user local key using the public key of the key management server 320 and generate a new public key encryption local key (S970). Then, the device 300 may transmit the public key encryption local key to the key management server 320 and substitute the previously stored public key encryption local key corresponding to the user 310 with the new public key encryption local key.

Figure 10:
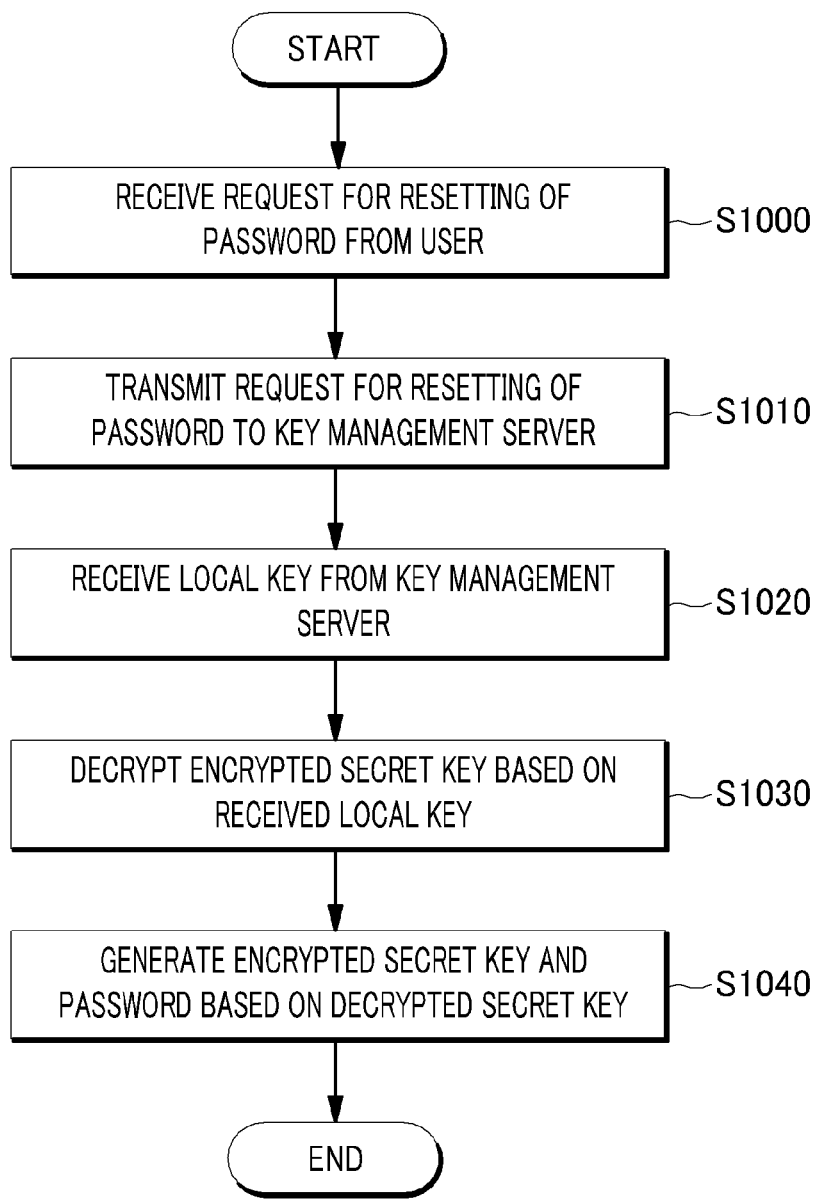
FIG. 10 is a flowchart of a password restoration method in the device 300 in accordance with an exemplary embodiment of the present disclosure.

FIG. 10 is a flowchart of a password restoration method in the device 300 in accordance with an exemplary embodiment of the present disclosure.

If the user 310 makes a request for resetting of a password (S1000), the device 300 may transmit the request for resetting of the password to the key management server 320 and make a request for authentication of the user 310 (S1010). Herein, the authentication of the user 310 may be performed as described above with reference to FIG. 6.

In response to the request for authentication from the device 300, the key management server 320 may perform authentication of the user 310. If the user 310 is authenticated, the key management server 320 may decrypt the public key encryption local key corresponding to the user 310 on the basis of the key management server public key. Further, the key management server 320 may transmit a temporary key to the user 310. Furthermore, the key management server 320 may encrypt the decrypted local key on the basis of the temporary key and generate a temporary key encryption local key and then transmit the generated temporary key encryption local key to the device 300.

The device 300 may receive the temporary key encryption local key from the key management server 320 (S1020). The device 300 may decrypt the user local key on the basis of the received temporary key encryption local key and a temporary key input by the user 310. Further, the device 300 may decrypt the encrypted user secret key on the basis of the decrypted user local key (S1030). Then, the device 300 may reset an encrypted user secret key and a password on the basis of the decrypted user local key and the decrypted user secret key.

Hereinafter, a key management server configured to provide secret key encryption and restoration in accordance with an exemplary embodiment of the present disclosure will be described with reference to FIG. 11.

Figure 11:
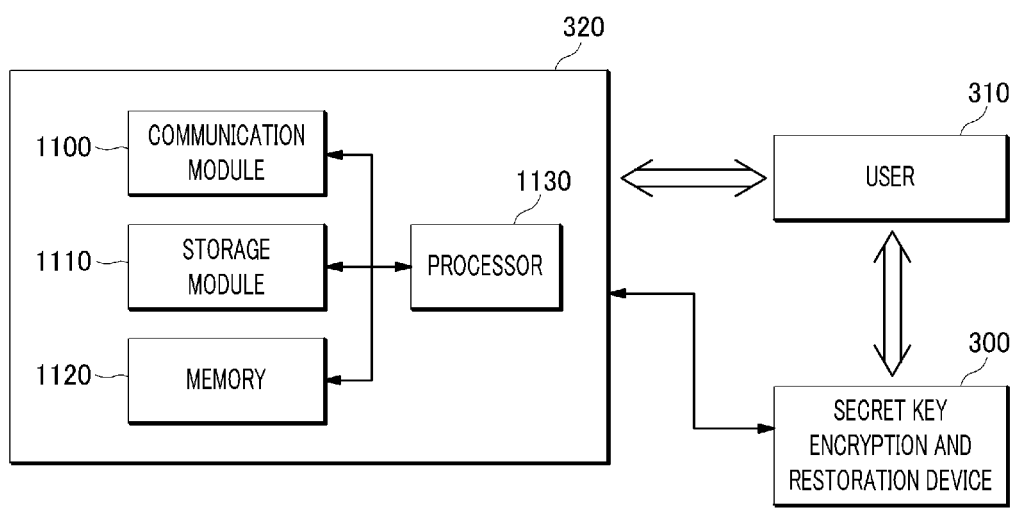
FIG. 11 is a block diagram of a key management server configured to provide secret key encryption and restoration in accordance with an exemplary embodiment of the present disclosure.

FIG. 11 is a block diagram of a key management server configured to provide secret key encryption and restoration in accordance with an exemplary embodiment of the present disclosure.

The key management server 320 configured to provide secret key encryption and restoration in accordance with an exemplary embodiment of the present disclosure provides encryption and restoration of a secret key of a user in a device. Herein, the key management server 320 includes a communication module 1100, a storage module 1110, a memory 1120, and a processor 1130.

The communication module 1100 performs communication with the user 310 and the device 300. Herein, the communication module 1100 may be a network module that provides wired or wireless network communication and a computing bus module such as IDE (integrated drive electronics), PCI (peripheral component interconnect) BUS, PATA (parallel ATA), SATA (serial ATA), and USB (universal serial bus.

The storage module 1110 is configured to store a user secret key encrypted on the basis of a public key and restoration information. Herein, the storage module 1110 may be provided as a storage device, such as a solid state driver and a hard disk driver, within the device 300. Otherwise, the storage module 1110 may be a storage device or storage module server connected through the communication module 1100.

The memory 1120 is configured to store a secret key encryption and restoration program. Herein, the memory 1120 is the collective name for non-volatile storage devices that can keep information stored therein even when power is not supplied.

The processor 1130 generates a key management server secret key and a key management server public key corresponding to the key management server secret key depend on execution of a program. Further, the processor 1130 may disclose the generated key management server public key.

Furthermore, the processor 1130 receives a local key and restoration information from the device 300 and stores them in the storage module 1110. To be specific, the device 300 may encrypt a user local key generated in the device 300 on the basis of the key management server public key and generate a public key encryption local key, and then transmit the generated public key encryption local key to the processor 130. The processor 1130 may store the public key encryption local key received from the device 300 through the communication module 1100 in the storage module 1110.

Further, the device 300 may generate restoration information for restoration of the user secret key and transmit the generated restoration information to the processor 1130. The processor 1130 may receive the restoration information for restoration of the user secret key from the device 300 and store the restoration information in the storage module 1110. Herein, the restoration information may be restoration parameters generated by the device 300. The device 300 may generate restoration coordinate information and restoration parameters on the basis of the user secret key. Further, the device 300 may transmit the generated restoration coordinate information to one or more trusted devices 330 and transmit the restoration parameters to the processor 1130. The processor 1130 may store the received restoration parameters in the storage module 1110.

If the device 300 selects the key management server 320 as a trusted device, the processor 1130 may receive the restoration parameters together with the restoration coordinate information transmitted from the device 300 through the communication module 1100. Then, the processor 1130 may store the received restoration coordinate information in the storage module 1110.

Meanwhile, if the user 310 corrupts or loses the user secret key, the device 300 may make a request for a local key and the restoration information to the processor 1130 in order to restore the user secret key. In response to the requests from the device 300, the processor 1130 transmits the local key and the restoration information to the device 300 through the communication module 1100. Herein, the transmitted restoration information may be restoration parameters. Further, if the key management server 320 is the trusted device 330, the transmitted restoration information may include restoration coordinate information.

Further, if the user 310 forgets the password, the device 300 may transmit a request for authentication of the user 310 to the processor 1130 in order to reset a password. In response to the request from the device 300, the processor 1130 may perform authentication of the user 310. Herein, the authentication of the user may include authentication using SMS, e-mail, and ARS previously set in the key management server 320 by the user 310, authentication using an OTP (one time password) token, and authentication through a certified authentication center. The processor 1130 in accordance with an exemplary embodiment of the present disclosure may perform authentication of the user 310 by multiple methods of the above-described authentication methods.

If the user 310 is authenticated, the processor 1130 may generate a temporary key for single use. Then, the processor 1130 may transmit the generated temporary key to the user 310 using SMS and e-mail previously set by the user 310 and share the temporary key with the user 310.

Further, the processor 1130 may generate a temporary key encryption local key on the basis of a temporary key based on the public key stored in the storage module 1110. To be specific, the processor 1130 may decrypt the public key encryption local key and encrypt the public key encryption local key again using a temporary key and thus generate a temporary key encryption local key. Furthermore, the processor 1130 may transmit the temporary key encryption local key to the device 300 through the communication module 1100.

Then, if a new public key encryption local key generated by the device 300 is received through the communication module, the processor 1130 may store the new public key encryption local key in the storage module 1110.

According to the device 300, the server 320, and the method for providing encryption and restoration of the user 310's secret key, the user 310's secret key is not stored in a central server such as the key management server 320. Thus, even if the key management server 320 is hacked, it is possible to suppress a leakage of the user 310's secret key. Further, according to the device 300, the server 320, and the method for providing encryption and restoration of the user 310's secret key, if the user 310 loses the secret key, it is possible to safely restore the secret key on the basis of restoration information distributed and stored in the trusted device 330.

According to the device 300, the server 320, and the method for providing encryption and restoration of the user 310's secret key, even if the user 310 forgets a password, it is possible to safely restore the existing secret key. Therefore, the user 310 does not need to be issued a new secret key. Furthermore, according to the device 300, the server 320, and the method for providing encryption and restoration of the user 310's secret key, when the user 310 forgets the password, the risk of losing the secret key can be reduced. Therefore, according to the device 300, the server 320, and the method for providing encryption and restoration of the user 310's secret key, it is possible to conveniently reset a password, and even if the user 310 forgets the password, it is possible to protect the user 310 against a leakage of important information such as payment information, financial information, and personal information.

The exemplary embodiments can be embodied in a storage medium including instruction codes executable by a computer or processor such as a program module executed by the computer or processor. A data structure in accordance with the exemplary embodiments can be stored in the storage medium executable by the computer or processor. A computer-readable medium can be any usable medium which can be accessed by the computer and includes all volatile/non-volatile and removable/non-removable media. Further, the computer-readable medium may include all computer storage and communication media. The computer storage medium includes all volatile/non-volatile and removable/non-removable media embodied by a certain method or technology for storing information such as a computer-readable instruction code, a data structure, a program module or other data. The communication medium typically includes the computer-readable instruction code, the data structure, the program module, or other data of a modulated data signal such as a carrier wave, or other transmission mechanism, and includes information transmission mediums.

The system and method of the present disclosure has been explained in relation to a specific embodiment, but its components or a part or all of its operations can be embodied by using a computer system having general-purpose hardware architecture.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner.

Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A secret key encryption and restoration device, comprising:
    a communication module;
    a memory that stores a secret key encryption and restoration program; and
    a processor that executes the program,
    wherein when a request for restoration of a secret key is received from a user, the processor restores the secret key of which restoration is requested on the basis of restoration information received from each of a key management server and one or more trusted devices according to execution of the program,
    the secret key of the user is generated and encrypted by the processor in response to the request from the user, and
    the restoration information is generated corresponding to the secret key and then transmitted to each of the key management server and the one or more trusted devices through the communication module,
    wherein the restoration information includes one or more restoration coordinate information and parameters generated on the basis of the secret key, and
    the processor transmits the one or more restoration coordinate information to the trusted devices and transmits the parameters to the key management server,
    wherein a number of the trusted devices is equal to or higher than a minimum number of the one or more restoration coordinate information,
    wherein the parameters include a prime number (p) used in a restoration coordinate generation process, a number (n) of coordinates (x, f(x)) for restoration, a number (k) of the trusted devices, and a coefficient (i) that has the same value as the secret key in a secret key restoration polynomial, and the one or more restoration coordinate information are k number of coordinates (x, f'(x), m) selected among n number coordinates and defined by the equation below:

$(x_0, f'(x_0), m_0), (x_1, f'(x_1), m_1), \ldots, (x_{k-1}, f'(x_{k-1}), m_{k-1})$, wherein (m) is a quotient added to each of the coordinates for restoration, and
    f'(x) is derived from the equation f'(x)=f(x)(mod p).

2. The secret key encryption and restoration device of claim 1,
    wherein the processor generates a password when generating the secret key, and
    when the restoration is requested, the processor decrypts the encrypted secret key on the basis of the generated password.

3. The secret key encryption and restoration device of claim 2,
    wherein after the secret key is restored, the processor generates the encrypted secret key on the basis of the password.

4. The secret key encryption and restoration device of claim 2,
    wherein after the secret key is restored, the processor generates a local key, and the processor generates the encrypted secret key on the basis of the password and the generated local key.

5. The secret key encryption and restoration device of claim 2,
    wherein when the secret key is generated, the processor generates a local key and transmit the generated local key to the key management server, and
    when a request for resetting of the password is made, the processor transmits the resetting request to the key management server, receives the local key from the key management server, and decrypts the encrypted secret key on the basis of the received local key and regenerates the encrypted secrete key and the password on the basis of the decrypted secret key.

6. The secret key encryption and restoration device of claim 5, further comprising:
    an input module,
    wherein the processor performs decryption of the encrypted secret key on the basis of the local key and a temporary key input by the user through the input module, and
    the temporary key is generated by the key management server and then transmitted to the user by the key management server.

7. A secret key encryption and restoration method in a device, comprising:
    receiving, by the device, each restoration information from a key management server and one or more trusted devices in response to a request for restoration of a secret key of a user; and
    performing, by the device, restoration of the secret key of which restoration is requested on the basis of the received restoration information,
    wherein the secret key is generated by the device and then encrypted, and
    the restoration information is generated corresponding to the secret key and then transmitted to the key management server and the one or more trusted devices,
    wherein the restoration information includes one or more restoration coordinate information and parameters generated on the basis of the secret key,
    the one or more restoration coordinate information is transmitted to the trusted devices and the parameters are transmitted to the key management server,
    wherein a number of the trusted devices is equal to or higher than a minimum number of the one or more restoration coordinate information,
    wherein the parameters include a prime number (p) used in a restoration coordinate generation process, a number (n) of coordinates (x, f(x)) for restoration, a number (k) of the trusted devices and a coefficient (i) that has the same value as the secret key in a secret key restoration polynomial, a quotient (m) added to each of the coordinates for restoration, and the one or more restoration coordinate information are k number of coordinates selected among n number coordinates (x, f'(x), m) and defined by the equation below:

$(x_0, f'(x_0), m_0), (x_1, f'(x_1), m_1), \ldots, (x_{k-1}, f'(x_{k-1}), m_{k-1})$, wherein (m) is a quotient added to each of the coordinates for restoration, and
    f'(x) is derived from the equation f'(x)=f(x)(mod p).

8. The secret key encryption and restoration method of claim 7, further comprising:
    prior to the receiving of each restoration information, generating, by the device, a password when the device generates the secret key;

encrypting, by the device, the secret key on the basis of the password; and decrypting, by the device, the encrypted secret key on the basis of the password.

9. The secret key encryption and restoration method of claim 8, further comprising:

after the performing of restoration of the secret key, generating, by the device, the encrypted secret key on the basis of the restored secret key and the password.

10. The secret key encryption and restoration method of claim 8, further comprising:

after the performing of restoration of the secret key, generating, by the device, a local key; and generating, by the device, the encrypted secret key on the basis of the password and the generated local key.

11. The secret key encryption and restoration method of claim 8, further comprising:

after the encrypting of the secret key on the basis of the password, transmitting, by the device, a request for resetting of the password to the key management server when the resetting request is made;

receiving, by the device, a local key from the key management server;

decrypting, by the device, the encrypted secret key on the basis of the received local key; and regenerating, by the device, the encrypted secret key and the password on the basis of the decrypted secret key, wherein the local key is generated by the device when the secret key is generated, and then transmitted to the key management server.

12. A non-transitory computer-readable storage medium having stored therein a program causing a computer to execute a secret key encryption and restoration process comprising:

receiving, by the computer, each restoration information from a key management server and one or more trusted devices in response to a request for restoration of a secret key of a user; and performing, by the computer, restoration of the secret key of which restoration is requested on the basis of the received restoration information, wherein the secret key is generated by the computer and then encrypted, and the restoration information is generated corresponding to the secret key and then transmitted to the key management server and the one or more trusted devices, wherein the restoration information includes one or more restoration coordinate information and parameters generated on the basis of the secret key, the one or more restoration coordinate information is transmitted to the trusted devices and the parameters are transmitted to the key management server, wherein a number of the trusted devices is equal to or higher than a minimum number of the one or more restoration coordinate information, wherein the parameters include a prime number (p) used in a restoration coordinate generation process, a number (n) of coordinates (x, f(x)) for restoration, a number (k) of the trusted devices and a coefficient (i) that has the same value as the secret key in a secret key restoration polynomial, and a quotient (m) added to each of the coordinates for restoration, and the one or more restoration coordinate information are k number of coordinates (x, f'(x), m) selected among n number coordinates and defined by the equation below:

$$(x_0, f'(x_0), m_0), (x_1, f'(x_1), m_1), \ldots, (x_{k-1}, f'(x_{k-1}), m_{k-1}),$$

wherein (m) is a quotient added to each of the coordinates for restoration, and f'(x) is derived from the equation f'(x)=f(x)(mod p).

* * * * *

UNITED STATES PATENT AND TRADEMARK OFFICE
CERTIFICATE OF CORRECTION

PATENT NO. : 10,020,939 B2
APPLICATION NO. : 15/140742
DATED : July 10, 2018
INVENTOR(S) : Heejo Lee et al.

Page 1 of 1

It is certified that error appears in the above-identified patent and that said Letters Patent is hereby corrected as shown below:

In the Specification

Column 8, Line 9 [Equation 3], replace "$(x_0,f'(x_0),m_0),(x_1,f'(x_1),m_1,...,(x_{k-1},f'(x_{k-1}),m_{k-1})$" with -- $(x_0,f'(x_0),m_0),(x_1,f'(x_1),m_1),...,(x_{k-1},f'(x_{k-1}),m_{k-1})$ --.

Signed and Sealed this
Ninth Day of October, 2018

Andrei Iancu
*Director of the United States Patent and Trademark Office*